US011277432B2

(12) United States Patent
Hassanzadeh et al.

(10) Patent No.: US 11,277,432 B2
(45) Date of Patent: Mar. 15, 2022

(54) GENERATING ATTACK GRAPHS IN AGILE SECURITY PLATFORMS

(71) Applicant: Accenture Global Solutions Limited, Dublin (IE)

(72) Inventors: Amin Hassanzadeh, Arlington, VA (US); Anup Nayak, Potomac, MD (US); Md Sharif Ullah, Norfolk, VA (US)

(73) Assignee: Accenture Global Solutions Limited, Dublin (IE)

( * ) Notice: Subject to any disclaimer, the term of this patent is extended or adjusted under 35 U.S.C. 154(b) by 229 days.

(21) Appl. No.: 16/554,846

(22) Filed: Aug. 29, 2019

(65) Prior Publication Data

US 2020/0177618 A1 Jun. 4, 2020

Related U.S. Application Data

(60) Provisional application No. 62/829,696, filed on Apr. 5, 2019, provisional application No. 62/774,516, filed on Dec. 3, 2018.

(51) Int. Cl.
*H04L 29/00* (2006.01)
*H04L 29/06* (2006.01)

(52) U.S. Cl.
CPC ........ *H04L 63/1433* (2013.01); *H04L 63/205* (2013.01)

(58) Field of Classification Search
CPC ... H04L 63/1433; H04L 63/205; H04L 63/20; H04L 63/1416; H04L 63/1441; G06F 21/552
See application file for complete search history.

(56) References Cited

U.S. PATENT DOCUMENTS 5,521,910 A * 5/1996 Matthews ........... H04L 12/5602
370/256
6,279,113 B1 8/2001 Vaidya
(Continued)

FOREIGN PATENT DOCUMENTS

EP 1559008 8/2005
EP 1768043 3/2007
(Continued)

OTHER PUBLICATIONS

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.
(Continued)

*Primary Examiner* — Don G Zhao
(74) *Attorney, Agent, or Firm* — Fish & Richardson P.C.

(57) ABSTRACT

Implementations of the present disclosure include providing a state graph representative of a set of action states within a network, each action state representing an attack that can be performed by an adversary within the network, determining a path stealthiness value for each attack path of a set of attack paths within the network, path stealthiness values being determined based on a mapping that maps each action state to one or more technique-tactic pairs and one or more security controls, determining a path hardness value for each attack path of the set of attack paths within the network, path hardness values being determined based on a state correlation matrix that correlates action states relative to each other, and a decay factor that represents a reduction in effort required to repeatedly perform an action of an action state, and selectively generating one or more alerts based on one or more of path stealthiness values and path hardness values.

27 Claims, 6 Drawing Sheets

(56) References Cited

U.S. PATENT DOCUMENTS

| | | | |
|---|---|---|---|
| 6,487,666 | B1 | 11/2002 | Shanklin et al. |
| 7,540,025 | B2 | 5/2009 | Tzadikario |
| 7,703,138 | B2 | 4/2010 | Desai et al. |
| 8,099,760 | B2* | 1/2012 | Cohen ............... H04L 63/1433 726/2 |
| 8,176,561 | B1 | 5/2012 | Hurst et al. |
| 8,656,493 | B2 | 2/2014 | Capalik |
| 9,256,739 | B1 | 2/2016 | Roundy et al. |
| 9,563,771 | B2* | 2/2017 | Lang ..................... G06F 21/604 |
| 9,633,306 | B2 | 4/2017 | Liu et al. |
| 10,084,804 | B2 | 9/2018 | Kapadia et al. |
| 10,291,645 | B1 | 5/2019 | Frantzen et al. |
| 10,447,721 | B2 | 10/2019 | Lasser |
| 10,447,727 | B1* | 10/2019 | Hecht .................... G06N 20/00 |
| 10,659,488 | B1* | 5/2020 | Rajasooriya .......... G06F 21/577 |
| 10,771,492 | B2 | 9/2020 | Hudis et al. |
| 10,848,515 | B1* | 11/2020 | Pokhrel .............. H04L 63/1416 |
| 10,868,825 | B1 | 12/2020 | Dominessy et al. |
| 10,956,566 | B2 | 3/2021 | Shu et al. |
| 10,958,667 | B1* | 3/2021 | Maida ................ H04L 63/1483 |
| 11,089,040 | B2 | 8/2021 | Jang et al. |
| 11,159,555 | B2 | 10/2021 | Hadar et al. |
| 11,184,385 | B2 | 11/2021 | Hadar et al. |
| 2005/0193430 | A1* | 9/2005 | Cohen .................. G06F 21/577 726/25 |
| 2006/0037077 | A1 | 2/2006 | Gadde et al. |
| 2008/0044018 | A1 | 2/2008 | Scrimsher et al. |
| 2008/0301765 | A1* | 12/2008 | Nicol ..................... H04L 63/20 726/1 |
| 2009/0077666 | A1 | 3/2009 | Chen et al. |
| 2009/0307772 | A1* | 12/2009 | Markham ........... H04L 63/1441 726/22 |
| 2010/0058456 | A1 | 3/2010 | Jajodia et al. |
| 2010/0138925 | A1* | 6/2010 | Barai ................. H04L 63/1433 726/25 |
| 2011/0035803 | A1* | 2/2011 | Lucangeli Obes ......................... H04L 63/1433 726/25 |
| 2011/0093916 | A1 | 4/2011 | Lang et al. |
| 2011/0093956 | A1 | 4/2011 | Laarakkers et al. |
| 2013/0097125 | A1* | 4/2013 | Marvasti ................. G06F 16/90 707/692 |
| 2013/0219503 | A1 | 8/2013 | Amnon et al. |
| 2014/0082738 | A1 | 3/2014 | Bahl |
| 2015/0047026 | A1* | 2/2015 | Neil .................... H04L 63/1433 726/22 |
| 2015/0106867 | A1 | 4/2015 | Liang |
| 2015/0261958 | A1 | 9/2015 | Hale et al. |
| 2015/0326601 | A1 | 11/2015 | Grondin et al. |
| 2016/0205122 | A1* | 7/2016 | Bassett ................. G06F 21/577 726/23 |
| 2016/0277423 | A1 | 9/2016 | Apostolescu et al. |
| 2016/0301704 | A1 | 10/2016 | Hassanzadeh et al. |
| 2016/0301709 | A1 | 10/2016 | Hassanzadeh et al. |
| 2017/0012836 | A1 | 1/2017 | Tongaonkar et al. |
| 2017/0032130 | A1 | 2/2017 | Durairaj |
| 2017/0041334 | A1 | 2/2017 | Kahn et al. |
| 2017/0085595 | A1 | 3/2017 | Ng et al. |
| 2017/0163506 | A1 | 6/2017 | Keller |
| 2017/0230410 | A1* | 8/2017 | Hassanzadeh ......... G06N 20/00 |
| 2017/0318050 | A1 | 11/2017 | Hassanzadeh et al. |
| 2017/0324768 | A1* | 11/2017 | Crabtree ............ H04L 63/1441 |
| 2017/0364702 | A1* | 12/2017 | Goldfarb ................ H04L 63/14 |
| 2017/0366416 | A1* | 12/2017 | Beecham ................ H04L 45/50 |
| 2018/0013771 | A1* | 1/2018 | Crabtree ............. H04L 63/1433 |
| 2018/0103052 | A1 | 4/2018 | Choudhury et al. |
| 2018/0152468 | A1 | 5/2018 | Nor et al. |
| 2018/0183827 | A1 | 6/2018 | Zorlular et al. |
| 2018/0255077 | A1* | 9/2018 | Paine ..................... H04L 63/145 |
| 2018/0255080 | A1 | 9/2018 | Paine |
| 2018/0295154 | A1* | 10/2018 | Crabtree ................ G06N 20/00 |
| 2018/0367548 | A1 | 12/2018 | Stokes, III et al. |
| 2019/0052663 | A1 | 2/2019 | Lee et al. |
| 2019/0052664 | A1 | 2/2019 | Kibler et al. |
| 2019/0141058 | A1* | 5/2019 | Hassanzadeh ...... H04L 63/0227 |
| 2019/0182119 | A1* | 6/2019 | Ratkovic ............. G06F 16/2379 |
| 2019/0188389 | A1* | 6/2019 | Peled ....................... H04L 63/20 |
| 2019/0312898 | A1* | 10/2019 | Verma .................... G06N 3/084 |
| 2019/0373005 | A1 | 12/2019 | Bassett |
| 2020/0014265 | A1 | 1/2020 | Whebe Spiridon |
| 2020/0042712 | A1 | 2/2020 | Foo et al. |
| 2020/0045069 | A1* | 2/2020 | Nanda .................... G06N 7/005 |
| 2020/0099704 | A1 | 3/2020 | Lee et al. |
| 2020/0128047 | A1 | 4/2020 | Biswas et al. |
| 2020/0137104 | A1 | 4/2020 | Hassanzadeh et al. |
| 2020/0175175 | A1 | 6/2020 | Hadar et al. |
| 2020/0177615 | A1 | 6/2020 | Grabois et al. |
| 2020/0177616 | A1 | 6/2020 | Hadar et al. |
| 2020/0177617 | A1 | 6/2020 | Hadar et al. |
| 2020/0177619 | A1 | 6/2020 | Hadar et al. |
| 2020/0296137 | A1 | 9/2020 | Crabtree et al. |
| 2020/0358804 | A1 | 11/2020 | Crabtree et al. |
| 2021/0006582 | A1 | 1/2021 | Yamada et al. |
| 2021/0168175 | A1 | 6/2021 | Crabtree et al. |
| 2021/0248443 | A1 | 8/2021 | Shu et al. |
| 2021/0273978 | A1 | 9/2021 | Hadar et al. |
| 2021/0409426 | A1 | 12/2021 | Engelberg et al. |
| 2021/0409439 | A1 | 12/2021 | Engelberg et al. |

FOREIGN PATENT DOCUMENTS

| | | |
|---|---|---|
| EP | 2385676 | 11/2011 |
| EP | 2816773 | 12/2014 |

OTHER PUBLICATIONS

Chen et al., "Distributed Attack Modeling Approach Based on Process Mining and Graph Segmentation," Entropy, Sep. 2020, 22(9):1026, 21 pages.

Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.

IEEE, "IEEE Standard for eXtensible Event Stream (XES) for Achieving Interoperability in Event Logs and Event Stream," IEEE Std 1849™-2016, Sep. 22, 2016, 50 pages.

Murata, "Petri Nets: Properties, Analysis and Applications," Proceedings of the IEEE, Apr. 1989, 77(4):541-580.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Pv.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

(56) References Cited

OTHER PUBLICATIONS

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Depth-first search," last updated Jun. 16, 2021, retrieved on Jul. 28, 2021, retrieved from URL<https://en.wikipedia.org/wiki/Depth-first search> 8 pages.
Abraham et al., "Cyber Security Analytics: A Stochastic Model for Security Quantification Using Absorbing Markov Chains," Journal of Communications, Dec. 2014, 9(12):899-907.
Atoum et al., "A holistic cyber security implementation framework," Information Management & Computer Security, Jul. 2014, 22(3):251-264.
Fielder et al., "Decision support approaches for cyber security investment," Decision Support Systems, Jun. 2016, 86:13-23.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
Grieves, "Virtually Intelligent Product Systems: Digital and Physical Twins", Complex Systems Engineering: Theory and Practice, Jul. 2019, 256:175-200.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Husák et al., "Survey of Attack Projection, Prediction, and Forecasting in Cyber Security," IEEE Communications Surveys & Tutorials, Sep. 24, 2018, 21(1):640-660.
International Organization for Standardization, "International Standard: ISO/IEC 27001," ISO/IEC 27001:2013(E), Oct. 1, 2013, 29 pages.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Khouzani et al., "Scalable min-max multi-objective cyber-security optimization over probabilistic attack graphs", European Journal of Operational Research, Nov. 1, 2019, 278(3):894-903.
Schatz et al., "Economic valuation for information security investment: a systematic literature review," Information Systems Frontiers, Apr. 18, 2016, 19:1205-1228.
Shandilya et al., "Use of Attack Graphs in Security Systems", Hindawi Journal of Computer Networks and Communications, Oct. 20, 2014, 2014:818957, 14 pages.
Strom et al., "MITRE ATT&CK™: Design and Philosophy", The MITRE Corporation, Jul. 2018, 37 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>, 41 pages.
Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
You et al., "A Review of Cyber Security Controls from An ICS Perspective," Proceedings of 2018 International Conference on Platform Technology and Service (PlatCon), Jan. 29-31, 2018, Jeju, South Korea, 5 pages.
Zeng et al., "Survey of Attack Graph Analysis Methods from the Perspective of Data and Knowledge Processing." Hindawi Security and Communication Networks, Dec. 26, 2019, 2019:2031063, 17 pages.
Zhang et al., "Optimal Decision-Making Approach for Cyber Security Defense Using Game Theory and Intelligent Learning," Security and Communication Networks. Dec. 23, 2019, 2019:3038586, 17 pages.
EP Search Report in European Application No. EP13290145, dated Nov. 12, 2013, 2 pages.
EP Search Report in European Application No. EP19212974, dated Feb. 14, 2020, 8 pages.
EP Search Report in European Application No. EP19212976, dated Feb. 14, 2020, 8 pages.
EP Search Report in European Application No. EP19212981, dated Mar. 4, 2020, 6 pages.
Purvine et al., "A Graph-Based Impact Metric for Mitigating Lateral Movement Cyber Attacks", Automated Decision Making for Active Cyber Defense, Oct. 2016, pp. 45-52.
Ullah et al., "Towards Modeling Attacker's Opportunity for Improving Cyber Resilience in Energy Delivery Systems", 2018 Resilience Weeks, Aug. 2018, pp. 100-107.
Borgatti et al., "A Graph-theoretic perspective on centrality," Social Networks, Oct. 2006, 28(4):466-484.
EP Search Report in European Application. No. EP20185251, dated Oct. 21, 2020, 7 pages.
Wang et al., "A Network Vulnerability Assessment Method Based on Attack Graph," 2018 IEEE 4th International Conference on Computer and Communications. Dec. 7-10, 2018, Chengdu, China, 1149-1154.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Narmeen Zakaria Bawany; DDoS Attack Detection and Mitigation Using SON: Methods, Practices, and Solutions; Springer-2017; p. 425-441.
3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.
Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.
Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.
EP Search Report in European Application. No. 21159421.3, dated Jun. 30, 2021, 11 pages.
Foundations of Databases, 1st ed., Abiteboul et al. (eds.), 1995, Chapter 12, 38 pages.
GE.com [online], "Predix Platform," available on or before Nov. 16, 2018 via Internet Archive: Wayback Machine URL<https://web.archive.org/web/20181116005032/https://www.ge.com/digital/iiot-

(56) References Cited

OTHER PUBLICATIONS platform> retrieved on Jul. 9, 2021, retrieved from URL<https://www.ge.com/digital/iiot-platfonn>, 6 pages.
Hansen et al., "Model-in-the-Loop and Software-in-the-Loop Testing of Closed-Loop Automotive Software with Arttest," Informatik, 2017, 13 pages.
Hofner et al., "Dijkstra, Floyd and Warshall meet Kleene," Formal Aspects of Computing, Jul. 2012, 24(4-6):459-476.
Idika et al., "Extending attack graph-based security metrics and aggregating their application," IEEE Transactions on Dependable and Secure Computing, Jan./Eeb. 2012, 9(1):75-85.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, April 13-15, 2009; Lecture Notes in Computer Science, Apr. 2009, 5451:345-359.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Phillips et al., "A graph-based system for network-vulnerability analysis," Proceedings of the 1998 Workshop on New Security Paradigms, Charlottesville, Virginia, Sep. 22-26, 1998, 71-79.
Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Stanek et al., "Method of comparing graph differencing algorithms for software differencing," 2008 IEEE International Conference on Electro/Information Technology, Ames, Iowa, May 18-20, 2008, 482-487.
Swiler et al., "A graph-based network-vulnerability analysis system," Sandia National Laboratories, 1997, Tech. Rep. SAND97-3010/1, 25 pages.
TechCrunch.com [online], "Tesla is rolling out its Navigate on Autopilot feature," Oct. 27, 2018, retrieved on Jul. 9, 2021, retrieved from URL<https://techerunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
Vehicle Power Management, 1st ed., Zhang et al. (eds.), Aug. 2011, Chapter 10, 27 pages.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerabilitv Scoring System," last updated Jun. 21, 2021, retrieved on Jul. 9, 2021, retrieved from URL<https://en.wikipedia.org/wikvCommon_Vulnerability_Scoring_System>, 7 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Yi et al., "Overview on attack graph generation and visualization technology," 2013 International Conference on Anti-Counterfeiting, Security and Identification (ASID), Shanghai, China, Oct. 25-27, 2013, 6 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhao et al., "Attack graph analysis method for large scale network security hardening," J. Front. Comput. Sci. Technology, 2018, 12(2):263-273 (with English Abstract).
Barik et al., "Attack Graph Generation and Analysis Techniques," Defence Science Journal, Nov. 2016, 66(6):559-567.
Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987, 92(5):1170-1182.
Cohen-Addad et al., "Hierarchical Clustering: Objective Functions and Algorithms," Journal of the ACM, Jun. 2019, 66(4):26, 42 pages.
Fundamentals of Business Process Management, 2nd ed., Dumas et al. (eds.), 1998, 546 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
National Institute of Standards and Technology [online], "National Vulnerability Database," last updated Jun. 2, 2020, retrieved on Jun. 3, 2020, retrieved from URL<https://nvd.nist.gov/>, 4 pages.
Networks: An Introduction, Newman (ed.), May 2010, 789 pages.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium. Aug. 2005, Baltimore, MD, USA, 16 pages.
Process Mining, 1st ed., van der Aalst, 2011, Chapters 5-6, 63 pages.

(56) References Cited

OTHER PUBLICATIONS

Sourceforge.net [online], "XSB," last updated Oct. 29, 2017, retrieved on Jun. 3, 2020, retrieved from URL <http://xsb.sourceforge.net/>, 2 pages.

The MITRE Corporation [online], "MITRE ATT&CK," last updated May 27, 2020, retrieved on Jun. 3, 2020, retrieved from URL <https://attack.mitre.org/>, 3 pages.

Wang et al., "Exploring Attack Graph for Cost-benefit Security Hardening: A Probabilistic Approach," Computers & Security, Feb. 2013, 32:158-169.

Wikipedia.org [online], "Active Directory," last updated Jun. 1, 2020. retrieved on Jun. 3, 2020, retrieved from URL <https://en.wikipedia.org/wiki/Active_Directory>, 14 pages.

Wikipedia.org [online], "Backward Chaining," last updated Nov. 16, 2019, retrieved on June 3, 2020, retrieved from URL <https://en.wikipedia.org/wiki/Backward_chaining>, 3 pages.

Wildpedia.org [online], "Cartesian Product," last updated Feb. 28, 2020, retrieved on Jun. 3, 2020, retrieved from URL <https://en.wikipedia.org/wiki/Cartesian_products>, 9 pages.

Wikipedia.org [online], "Centrality," last Updated May 29, 2020, retrieved on Jun. 3, 2020, retrieved from URL <https://en.wikipedia.org/wiki/Centrality>, 15 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

Wikipedia.org [online], "Forward Chaining," last updated Nov. 18, 2019, retrieved on Jun. 3, 2020, retrieved from URL <https://en.wikipedia.org/wiki/Forward_chaining>, 3 pages.

Wikipedia.org [online], "Look-ahead (backtracking)," last updated May 23, 3030, retrieved onl Jun. 3, 2020, retrieved from URL <https://en.wikipedia.org/wiki/Look-ahead (backtracking)>, 3 pages.

Wikipedia.org [online], "SCADA," last updated Jun. 2, 2020, retrieved on Jun. 3, 2020, retrieved from URL <https://en.wikipedia.org/wiki/SCADA>, 12 pages.

EP Extended Search Report in European Appln. No. 21191752.1, dated Jan. 4, 2022, 8 pages.

Q. Liu et al., "Latte: Large-Scale Lateral Movement Detection," MILCOM 2018—2018 IEEE Military Communications Conference (MILCOM), 2018, pp. 1-6. doi: 10.1109/MILCOM.2018.8599748. (Year: 2018).

X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).

\* cited by examiner

GENERATING ATTACK GRAPHS IN AGILE SECURITY PLATFORMS

CROSS-REFERENCE TO RELATED APPLICATIONS

This application claims priority to U.S. Prov. App. No. 62/774,516, filed on Dec. 3, 2018 and U.S. Prov. App. No. 62/829,696, filed on Apr. 5, 2019, the disclosures of which are incorporated herein by reference in their entireties.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

In general, attacks on CINFs occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path towards a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real-world attack scenarios.

SUMMARY

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems. The agile security platform of the present disclosure executes in a non-intrusive manner.

In some implementations, actions include providing a state graph representative of a set of action states within a network, each action state representing an attack that can be performed by an adversary within the network, determining a path stealthiness value for each attack path of a set of attack paths within the network, path stealthiness values being determined based on a mapping that maps each action state to one or more technique-tactic pairs and one or more security controls, determining a path hardness value for each attack path of the set of attack paths within the network, path hardness values being determined based on a state correlation matrix that correlates action states relative to each other, and a decay factor that represents a reduction in effort required to repeatedly perform an action of an action state, and selectively generating one or more alerts based on one or more of path stealthiness values and path hardness values. Other implementations of this aspect include corresponding systems, apparatus, and computer programs, configured to perform the actions of the methods, encoded on computer storage devices.

These and other implementations can each optionally include one or more of the following features: each path stealthiness value is determined based on the one or more security controls that are identified for each action state; each security control includes one or more devices that inhibit attacks within the network; the state correlation matrix includes a set of correlation values, each correlation value including an attack method correlation value and an environmental correlation value; correlation values are determined based on threat intelligence data from one or more threat intelligence databases; selectively generating one or more alerts based on one or more of path stealthiness values and path hardness values includes determining that a path stealthiness value violates a respective threshold value, and in response, generating an alert, the alert indicating at least a portion of an attack path associated with the path stealthiness value; selectively generating one or more alerts based on one or more of path stealthiness values and path hardness values comprises determining that a path hardness value violates a respective threshold value, and in response, generating an alert, the alert indicating at least a portion of an attack path associated with the path hardness value; the mapping is provided based on data provided from an adversarial tactics database; and a tactic in a technique-tactic pair represents an operation an adversary can execute within the network and a technique in the technique-tactic pair represents an action that an adversary can perform to facilitate execution of the tactic.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
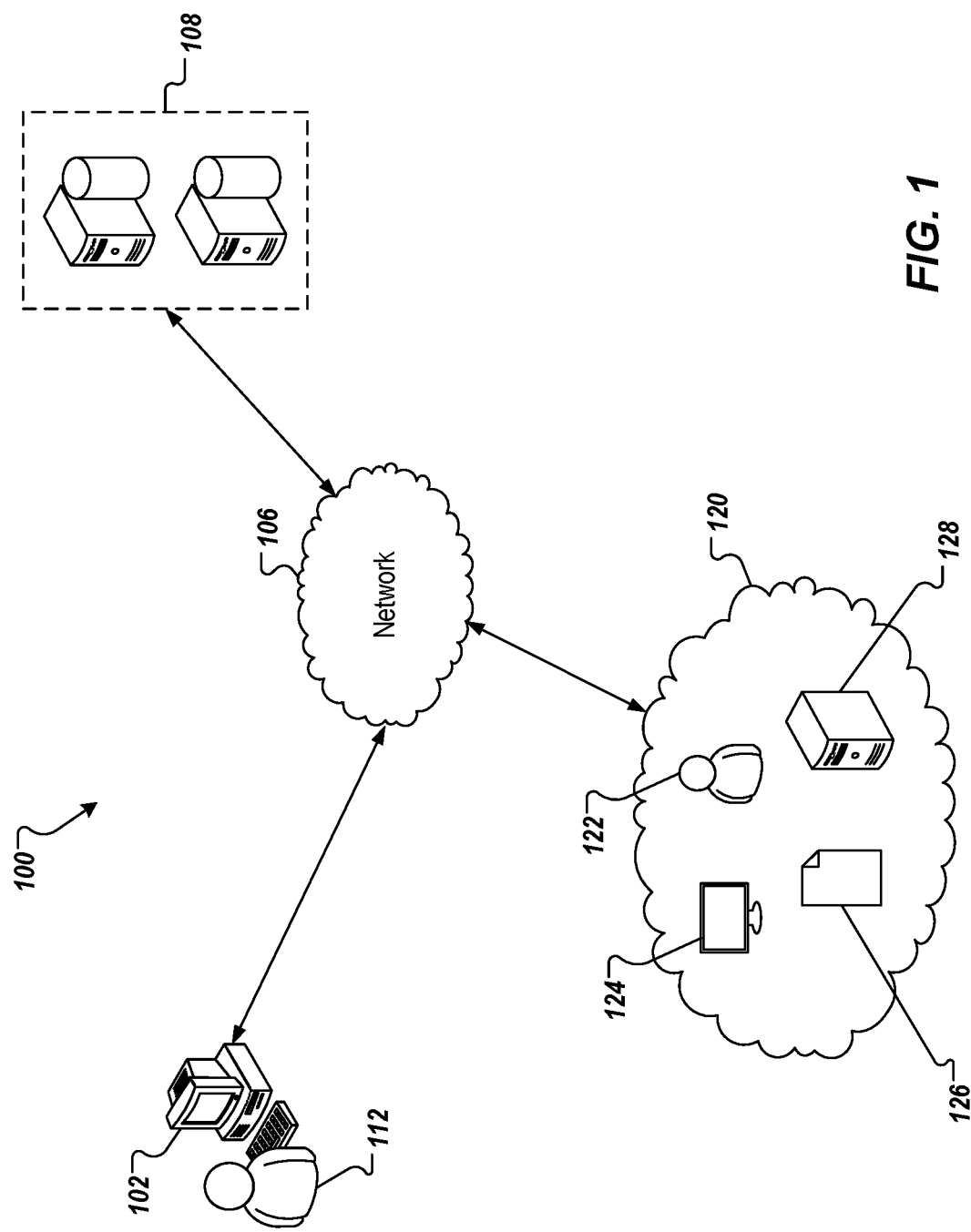
FIG. 1 depicts an example architecture that can be used to execute implementations of the present disclosure.

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspect of enterprise information technology (IT) systems, and enterprise operational technology (OT) systems, asset value, potential for asset breach, and criticality of attack paths towards target(s) including hacking analytics of enterprise IT/OT systems performed in a non-intrusive manner. In general, and as described in further detail herein, the agile security platform of the present disclosure prioritizes risks and respective remediations based on vulnerabilities of assets within an enterprise network (e.g., cyber intelligence and discovery aspect of IT/OT systems), the value of the assets, and the probability that the assets will be breached in terms of attacker's effort and security control employed in the network.

To provide context for implementations of the present disclosure, and as introduced above, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINFs have been intentionally targeted intentionally and have suffered from significant losses when successfully exploited.

In general, attacks on CINFs occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider the topological connection between stepping stones to measure the difficulty of reaching a target. As another example, some traditional techniques only assume some predefined attacker skill set to estimate the path complexity. In reality, an attacker's capabilities and knowledge of the enterprise network evolve along attack paths to the target.

In view of the above context, implementations of the present disclosure are directed to an agile security platform that overcomes deficiencies of traditional techniques. More particularly, the agile security platform of the present disclosure considers attack complexity within an interconnected cyber infrastructure with a variety of attack paths to comprehensively address real attack scenarios. In general, implementations of the present disclosure provide a cyber-threat analysis framework based on characterizing adversarial behavior in a multi-stage cyber-attack process. As described in further detail herein, how a threat proceeds within a network is investigated using an attack graph (AG) and all possible attack stages are identified. In some implementations, each stage can be associated with network attributes. Using a holistic view of threat exposure provided by AGs, implementations of the present disclosure incorporate attack techniques and tactics into stepping stones found in the AG.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

In some implementations, actions include providing a state graph representative of a set of action states within a network, each action state representing an attack that can be performed by an adversary within the network, determining a path stealthiness value for each attack path of a set of attack paths within the network, path stealthiness values being determined based on a mapping that maps each action state to one or more technique-tactic pairs and one or more security controls, determining a path hardness value for each attack path of the set of attack paths within the network, path hardness values being determined based on a state correlation matrix that correlates action states relative to each other, and a decay factor that represents a reduction in effort required to repeatedly perform an action of an action state, and selectively generating one or more alerts based on one or more of path stealthiness values and path hardness values.

As described herein, the agile security platform of the present disclosure enables continuous cyber and enterprise-operations alignment controlled by risk management. The agile security platform of the present disclosure improves decision-making by helping enterprises to prioritize security actions that are most critical to their operations. In some implementations, the agile security platform combines methodologies from agile software development lifecycle, IT management, development operations (DevOps), and analytics that use artificial intelligence (AI). In some implementations, agile security automation bots continuously analyze attack probability, predict impact, and recommend prioritized actions for cyber risk reduction. In this manner, the agile security platform of the present disclosure enables enterprises to increase operational efficiency and availability, maximize existing cyber-security resources, reduce additional cyber-security costs, and grow organizational cyber resilience.

As described in further detail herein, the agile security platform of the present disclosure provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data.

In some implementations, the agile security platform of the present disclosure is hosted within the server system 108, and monitors and acts on the enterprise network 120, as described herein. More particularly, and as described in further detail herein, the agile security platform detects IT/OT assets and generates an asset inventory and network maps, as well as processing network information to discover vulnerabilities in the enterprise network 120. Further, the agile security platform provides a holistic view of network and traffic patterns. In some examples, the enterprise network 120 includes multiple assets. Example assets include, without limitation, users 122, computing devices 124, electronic documents 126, and servers 128.

In some implementations, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform of the present disclosure addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform of the present disclosure, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
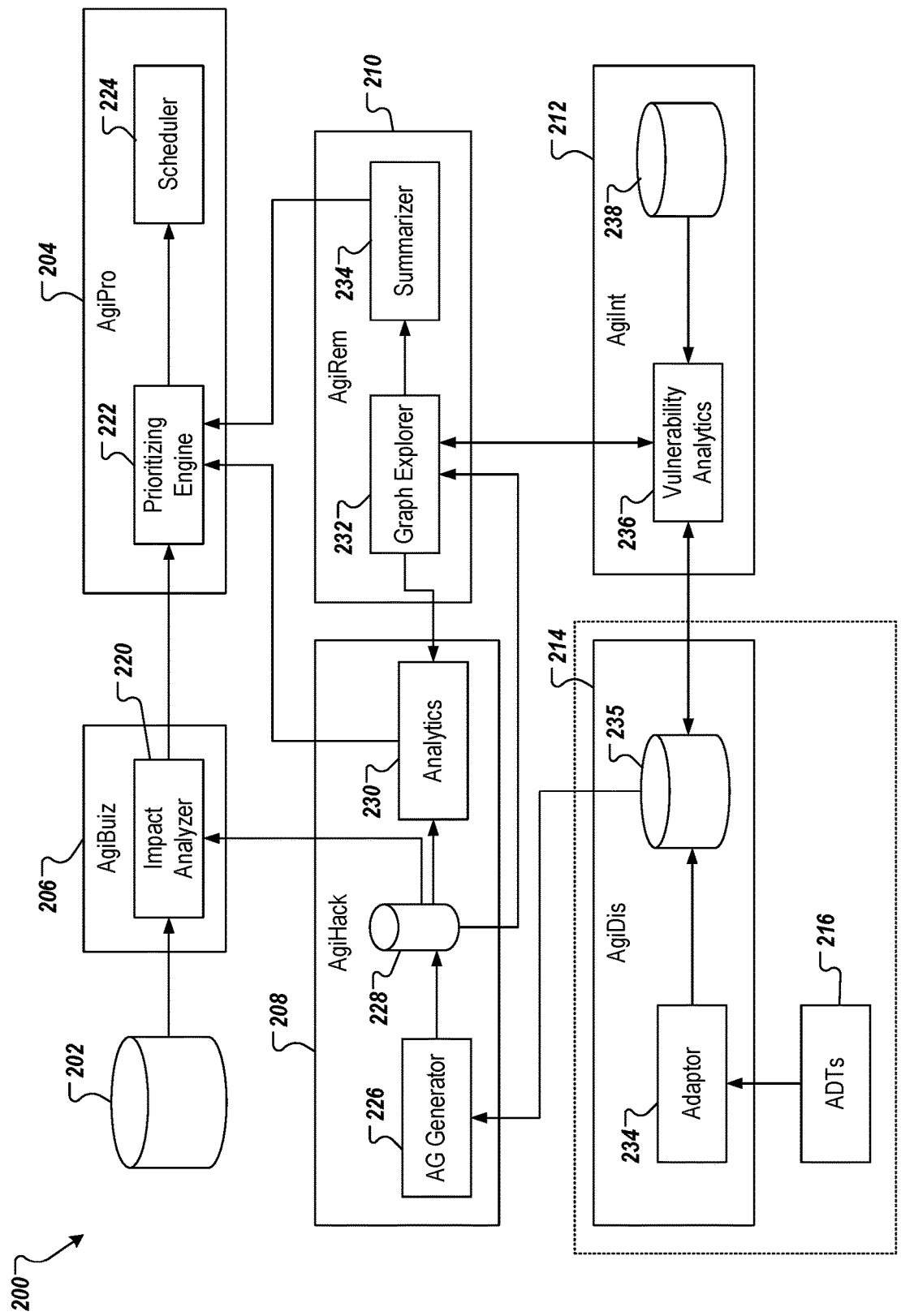
FIG. 2 depicts an example conceptual architecture of an agile security platform of the present disclosure.

FIG. 2 depicts an example conceptual architecture 200 of an agile security (AgiSec) platform in accordance with implementations of the present disclosure. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an attack graph (AG) generator 226, an AG database 228, and an analytics module 230. In general, the AgiHack service 208 constructs AGs and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AGs are provided, each AG corresponding to a respective target within the enterprise network. Further, the AgiHack service 208 identifies possible impacts on the targets. In some examples, the AG generator 226 uses data from the asset/vulnerabilities knowledge base 236 of the AgiDis service 214, and generates an AG. In some examples, the AG graphically depicts, for a respective target, all possible impacts that may be caused by a vulnerability or network/system configuration, as well as all attack paths from anywhere in the network to the respective target. In some examples, the analytics module 230 processes an AG to identify and extract information regarding critical nodes, paths for every source-destination pair (e.g., shortest, hardest, stealthiest), most critical paths, and critical vulnerabilities, among other features of the AG. If remediations are applied within the enterprise network, the AgiHack service 208 updates the AG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths. For example, the AgiRem service 210 can execute a cyber-threat analysis framework that characterizes adversarial behavior in a multi-stage cyber-attack process, as described in further detail herein.

In further detail, for a given AG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

In the context of cyber security, a critical node, also referred to herein as cardinal node, can represent a CI that is a key junction for lateral movements within a segmented network. Namely, once acquired as a target, the cardinal node can trigger multiple new attack vectors. Cardinal nodes can also be referred to as "cardinal faucet nodes." Another node will be one that many hackers' lateral movements can reach, yet it cannot lead to an additional node. Such nodes can be referred to as "cardinal sink nodes." In the network graph, the more edges from a cardinal faucet node to other nodes, the higher the faucet attribute is. The more incoming edges to a cardinal node, the higher the sink attribute is. If a node has both sink and faucet values in correlation, the more overall cardinal this node becomes to the entire examined graph topology and is defined as a critical target to be acquired since it provides control over multiple nodes in the graphs. In certain situations, the search for a faucet attribute is more important than a sink attribute. Such as a case of finding what node to block first to prevent a segregation of an attack outbreak. In case of finding what is very hard to protect, the more sink attributes matter more.

Figure 3:
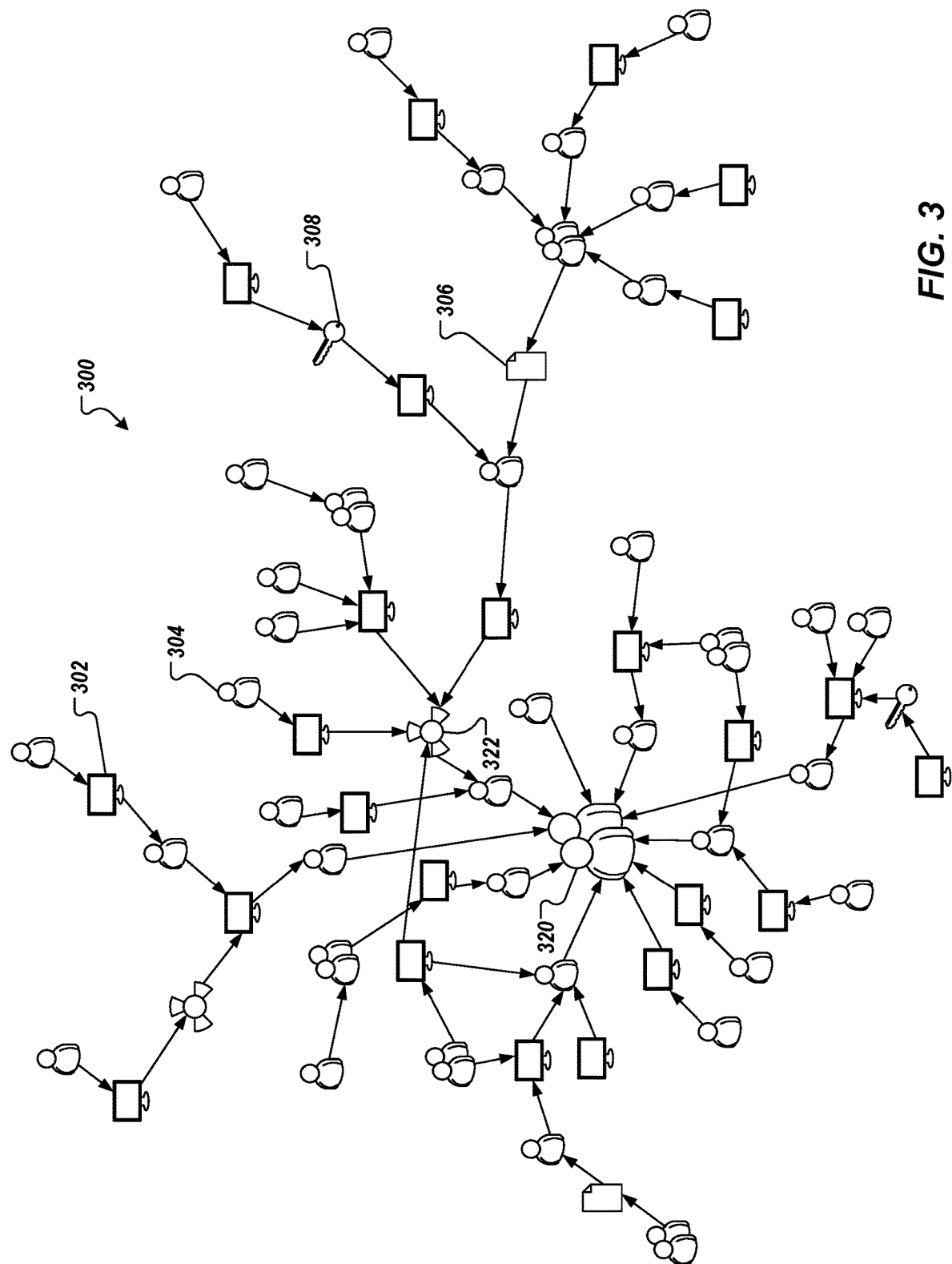
FIG. 3 depicts an example attack graph in accordance with implementations of the present disclosure.

FIG. 3 depicts an example portion 300 of an AG in accordance with implementations of the present disclosure. In some implementations, an AG is provided based on the network topology of the enterprise network. For example, the AgiHack service 208 of FIG. 2 can generate one or more AGs based on information provided from the AgiDis service 214. In some examples, an AG includes nodes and edges (also referred to as arches) between nodes. In some examples, a node can be associated with a semantic type. In the example domain of cyber-security and network topology, example semantic types can include, without limitation, computer 302, user 304, file 306, and key 308.

In some examples, an edge can include an incoming (sink) edge (e.g., an edge leading into a node from another node) or an outgoing (faucet (or source)) edge (e.g., an edge leading from a node to another node). In some examples, each edge can be associated with a respective activity. In the example domain of cyber-security and network topology, example activities can include, without limitation, logon (credentials), operating system access, and memory access. In some examples, each edge can be associated with a respective weight. In some examples, the weight of an edge can be determined based on one or more features of the edge. Example features can include a traffic bandwidth of the edge (e.g., how much network traffic can travel along the edge), a speed of the edge (e.g., how quickly traffic can travel from one node to another node along the edge), a difficulty to use the edge (e.g., network configuration required to use the edge), and a cost to use the edge (e.g., in terms of technical resources, or financial cost). In some examples, the weights of the edges are determined relative to each other (e.g., are normalized to 1).

In some implementations, each node can be associated with a set of attributes. Example attributes can include, without limitation, the semantic type of the node, a number of incoming edges, a number of outgoing edges, a type of each of the edges, a weight of each of the edges, and the like. In some implementations, one or more values for a node can be determined based on the set of attributes of the node, as described in further detail herein.

The example portion 300 of the AG includes tens of nodes (approximately 70 nodes in the example of FIG. 3). It is contemplated, however, that an AG can include hundreds, or thousands of nodes. In some examples, the example portion 300 of the AG is a visualization of part of the AG based on one or more filter parameters. In some examples, a user can define filter parameters that can be used to identify cardinal nodes within an AG, and segments of the AG that may be relevant to a cardinal node. In general, segments of the AG can be based on actual network segments based on subnetworks, VLANs, geographically dispersed enterprise networks, and the like. In these cases, the AG generator can generate separate AGs (one per segment) or create one comprehensive AG and visualize the comprehensive AG in multiple segments based on the criteria described herein. In the example of FIG. 3, a node 320 can be determined to be a cardinal node based on one or more filter parameters (e.g., no outgoing edges, and more than three incoming edges). In some examples, other depicted nodes include nodes along lateral paths that lead to a cardinal node.

In the example of FIG. 3, the node 320 can represent administrator credentials, a relatively high-value target within an enterprise network, and all other edges and nodes define the paths within the AG that lead to the node 320. While the AG can include hundreds, or thousands of nodes and edges, the example portion 300 is provided based on identification of the node 320 as the cardinal node (e.g., based on filter parameters) and all paths of the AG that lead to the node 320. In this manner, the portion 320 provides a more easily consumable visualization than depicting an entirety of the AG.

In some implementations, other nodes besides the cardinal node can be identified as relatively important nodes (e.g., relative to other depicted nodes). In some examples, the relative importance of a node can be determined based on attack paths that lead to a cardinal node. In the example of FIG. 3, a node 322 can be determined to be a relatively important node. Starting from the node 322, there is a single hop (a single attack path with one hop) to the node 320. However, there are approximately ten different attack paths that the node 322 is included in. Consequently, security resources could be concentrated on the node 322, as opposed to nodes upstream of the node 322 in the multiple attack paths. In this manner, security resources can more efficiently protect the node 320, as described in further detail herein.

Further, AGs can change over time. That is, there is a multi-dimensional aspect to AGs with one dimension including time. For example, and with continued reference to the example of FIG. 3, the node 320 can be considered a cardinal node based on the filter parameters. At another time, the node 320 might no longer be considered a cardinal node. For example, between the first time and the second time, values of attributes may have changed for nodes, some nodes may have been removed from the network (e.g., computers retired, users removed), and/or some nodes may have been added to the network (e.g., new computers/users). As one non-limiting example, new vulnerabilities may have been discovered after the first time, which definitively changes the AG as generated at the second time.

As introduced above, and in accordance with implementations of the present disclosure, a cyber-threat analysis framework is provided and characterizes adversarial behavior in a multi-stage cyber-attack process. In some implementations, the cyber-threat analysis framework is provided as part of an agile security platform, such as the AgiSec platform of FIG. 2. For example, the AgiRem service 210 can execute the cyber-threat analysis framework, as described herein. In general, and as described in further detail, the cyber-threat analysis framework ingests an AG, such as that described above with reference to FIG. 3.

In further detail, implementations of the present disclosure model an attack progression in a network using multiple phases. Example phases can include, without limitation, opportunity, capability and intent. Implementations of the present disclosure also analyze attack progression from an attacker perspective and a defender perspective to the multiple phases. In this manner, a chain of phases from opportunity to capability to intent is provided and a scope for executing each phase is based on a preceding phase. Opportunity is the starting point of the chain and is directed to identifying what opportunities for exploitation exist within the network and identifying different ways to move from a perimeter point through the network. After understanding the opportunities and available actions, penetration into the network relies on capability. Intent is the last phase. These phases have different views in terms of the attacker perspective and the defender perspective.

With regard to the defender perspective, an AG can capture the holistic view of the attack opportunity in the entire network. It provides the ability to grasp potential exploitation of vulnerabilities along attack paths and their respective consequences in the particular context. An AG can identify all ways an attacker can get into and penetrate through the network. Using an AG, the defender can track the attack capability by the technical exposure through attack paths. The defender can assume that, at each phase, the attacker can accumulate knowledge of the network given their own skill and move further. Consequently, similar actions associated with other environmental features gives the most probable paths with equal likely capability. Defenders can map the intent of attack in network under investigation to the mission critical targets all the way from penetration points. In this manner, defenders might only focus on the exposures helping attackers to those goals.

With regard to the attacker perspective, opportunity describes the stages the attacker can transpire through the network. While an AG can also fulfill this purpose for the attacker, unlike the defender, the attacker does not have access to an AG (i.e., the whole view of the network). Every execution expands the attacker's view and give more options to take. The capability is defined by the potential exposure each stage can provide. More specifically, it depends on two uncertain factors of the particular attacker: intrinsic knowledge and evolving skill. Achieving a state does not mean that the attacker gains all knowledge from that state. For example, in a dumping credential technique, an attacker will obtain all cached credentials, which could help to move laterally to the network. But in practice, the attacker might have a priori knowledge of those cached credentials. This phenomenon gives the uncertainty in the skill gain of the attacker. The intent of the attacker through penetration comes with different motivations and constraints. Some attackers are persistent and/or are goal-specific (e.g., cyber espionage) that is motivated to get into the final target to perform severe damage. Such attackers are more technically sophisticated and may be able to avoid detection. Some constraint-bounded attacker (e.g., time and/or resource constraints) focus on sub-goals. These types of attacks are normally generated by pre-engineered tools or mechanisms.

In order to investigate the behavior of an attacker, security administrators typically track low-level threat artifacts (e.g., hash values, IP addresses, domain names). These are often termed technical threat intelligence. Although it is relatively easy to integrate these artifacts within a defense system, a low-level indicator of compromise (IoC) is of limited utility in defending against sophisticated adversaries. These indicators are susceptible to change over time as attackers use botnets, random domain names or dynamically change hash values with relative ease. On the other hand, actions of the attacker typically follow a particular sequence, which can be reused with little modification. Attributes related to actions can be referred to as behavioral attack signatures of threats and can include, for example, network/host artifacts, tools, and tactics, techniques and procedures (TTPs). These indicators are very hard to change for a particular group of attackers (e.g., script kiddies, hacktivists, cybercriminals, state-sponsored attackers). Consequently, defense systems that take these threat artifacts into account presents a tougher obstacle to attackers.

Network/host artifacts can be described from the perspective of the defense mechanism. For reactive defense, such artifacts represent the attack traces in the network and host. For proactive defense, such artifacts represent the conditions that allow the attacker to propagate. Tools refers to the software or utilities attackers use to accomplish their objectives. Naive attackers rely on public exploits or open source tools where skilled and stealthy attackers use obfuscation as well as utilities that are part of the operating system.

Attackers can take different strategies and paths to achieve their objectives. TTPs can capture this kind of latent behavior of the attacker. It describes the approach of the particular attacker at different levels of granularity within a cyber-attack campaign. Tactic refers to how an adversary can operate part of the cyber-attack campaign. A particular tactic might have different ramifications depending on the adversary type. Technique provides a detailed description within the context of a tactic. In other words, the techniques are meant to facilitate the execution of different tactics. While technique includes actions without specific direction, the procedure provides more low-level detail correspond to a technique. For example, the procedure includes all of the necessary steps to complete an action. A well-tailored procedure increases the success rate of a technique.

However, these behavioral attributes do not contain a level of information that enables comprehensive understanding of the behavior of an attacker. For an attacker, learning a new technique or adapting to a new method is more difficult than learning tools and learning tools is more difficult than learning network/host artifacts. As described in further detail herein, implementations of the cyber-threat analysis framework of the present disclosure identify these features and integrate the features into an efficient threat analysis.

The cyber-threat analysis framework of the present disclosure leverages an AG. In some examples, the AG is generated by an AgiSec platform, such as that described herein. In mathematical terms, an attack graph is a directed graph modeled as G (V, E) with a set of nodes $V = \{v_1, \ldots, v_n\}$ and a set of edges $E = \{e_1, \ldots, e_m\}$ connecting nodes together, where $|V| = n$ and $|E| = m$.

Figure 4:
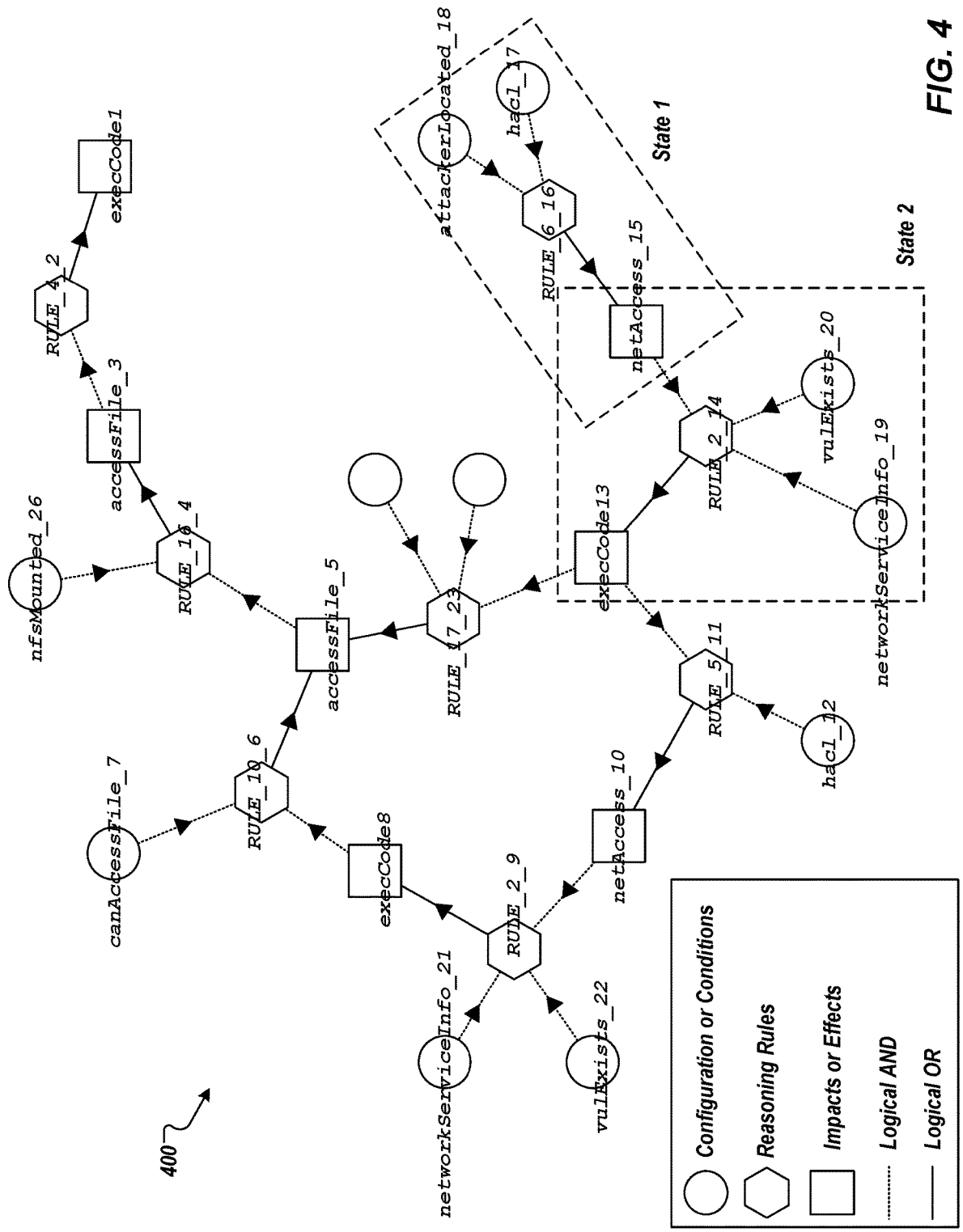
FIG. 4 depicts an example portion of an example attack graph to illustrate implementations of the present disclosure.

FIG. 4 depicts an example portion 400 of an example attack graph to illustrate implementations of the present disclosure. As depicted in the example of FIG. 4, the AG can include different node types to show how a set of network and system configurations result in unauthorized actions to specific targets. The example portion 400 is depicted in a database structure (e.g., Neo4j graph database structure). Nodes in an AG are of different types: circular nodes representing system or network configurations that are the conditions that provide possibilities for actions by an attacker; hexagonal nodes representing reasoning rules that represent the attack methodology leveraged by an attacker to achieve a particular goal; and square nodes that represent an impact as a sub-goal for a certain action an attacker could take. The AG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AG is created by taking into account the configurations directed by some rules in order to make some impacts on the target network. In some examples, all configuration nodes, impact nodes, and rule nodes can be provided in sets C, I, R, respectively. Accordingly, $C=\{c_j|c_j \in V, \forall c_j$ is a configuration$\}$, $I=\{i_j|i_j \in V, \forall i_j$ is an impact$\}$, and $R=\{r_j|r_j \in V, \forall r_j$ is a rule$\}$. Consequently, the combination of these sets accounts for all vertices of the graph G (i.e., $V=\{C, I, R\}$).

In order to find every possible option from external attackers toward specific targets in a network, entry points to the network are identified. Entry points can include assets that are exposed to the Internet, for example, through an open port that is reachable from the public space. Each host h in a network can be analyzed to find all paths from any source host $h_a$ in the network (e.g., entry nodes) to any target host $h_b$. In the AG, a path traversal only occurs from the current position of the attacker triggered by a rule to escalate their privilege or penetrate to a new host. In the AG, only the impact nodes depict the position of attacker. Consequently, an attack path is provided as a path from a host to another host and can be shown as:

$$P_{ab} = p_{(h_a - h_b)} = p_{(i_i - i_j)} = \{v_j | \forall v_j \in I \text{ or } R\}$$

and $$P_{ab} = P_{(h_a - h_b)} = \{p_j | p_j \text{ is } p_{(h_a - h_b)}\}$$

is the set of all paths from host $h_a$ to host $h_b$.

As introduced above, path traversal can be efficiently tracked with the rule (R) vertices and the impact (I) vertices of the AG. The set C only contains the enabling conditions to trigger a rule. The properties of paths in a graph can be analyzed in different ways. A focus is to identify how attackers penetrate through a path and the difficulties the attackers face along the path. The difficulties can be modeled in multiple ways including, for example, shortest path, hardest path, and stealthiest path. In some examples, the shortest path is a path having minimum steps that an attacker needs to encounter before reaching a specific target. Here, each step is defined as a distinct security state of a network, as described in further detail herein. In some examples, the hardest path is measured in terms of toughness of a path to traverse. This depends on the capability the attacker and action challenges associated with a path. In some examples, the stealthiest path is defined as having minimum detection for propagation of the attack.

With regard to shortest path, the shortest path between two hosts is defined as how many hops an attacker needs to pass before reaching a target node from a source node. Given the path between two nodes $P_{(h_a - h_b)}$, the shortest path is denoted as:

$$p_{(h_a - h_b)}^{sh} = \min\{|P_1|, \ldots, |P_k|\}$$

where $\{P_1, \ldots, P_k\}$ is the set of paths and $|P_k|$ represents the length of the $k^{th}$ path. In some examples, each path length $|P_j| = \{|i_n|, |i_n \in I\}$ can be calculated by the cardinality of impact nodes in that path. For the length of the path, how many actions or privileges an attacker needs to face to achieve their goal are determined, and each is assigned by the impact nodes (e.g., execCode, access File). The number of physical nodes or hosts on a path is denoted as $|\hat{P}_k|$ where $\hat{P}_k = \{i | \forall i_j, i_{j'}, h_j \neq h_{j'}\}$. Consequently, physical nodes are mapped by unique impact nodes usually associated with distinct IP address or host address in the network.

As discussed above, the shortest path analysis deals with the number of steps attackers take to reach their goal. However, this does not represent the likelihood of a path to get compromised. That is, attackers do not always select the shortest path. In ICS networks, in addition to the number of steps, how probable a path from a source to destination is determined. In some implementations, the path probability is provided in multiple dimensions. For example, in a vulnerable network, attack paths can be enumerated from different parts of the network to one or more targets. Because analysis solely depends on known vulnerabilities, the likelihood of each exploitable path can be measured by the vulnerability exploitation probability along with the particular path.

In some implementations, a base score metric of the Common Vulnerability Scoring System (CVSS) (provided by the National Vulnerability Database (NVD)) is used to find the probability of each vulnerability exploitation. In the example of FIG. 4, an attack path can be identified by node number, such as hacl_17 → RULE_6_16 → netAccess_15 → RULE_2_14 → execCode13. The probability of this path can be calculated by the product of their associated likelihood of discovery or exploitability score (e.g., [1×1×0.5× 1×0.4]=0.2).

In real-world networks, there are often multiple paths between two hosts and independently analyzing each path can be relatively complex. Moreover, each single path is initiated by multiple configurations, which needs to be integrated for accurate calculation. In some implementations, Bayesian network (BN) is used as a model for this analysis. BN can be used to show the probabilistic causal relationship among all nodes. In some examples, the AG can be transformed to provide a BN that includes nodes and directed edges between nodes. The directed edges between nodes represents their influence on each other. The strength of such influence can be captured by a corresponding conditional probability table (CPT).

Continuing with the example above, a CPT provides that the RULE_2_14 (e.g., identified as node no. 14 in the CPT) is triggered only if all of the incoming conditions are true, thus, probability is 1, and for any other condition it is 0. This triggered rule initiates the opportunity of the exploit execution (execcode13) with probability 0.7, which is provided based on the CVSS score. Integrating BN into analysis of the AG enables efficient computation of the probability of any event given the evidence (e.g., Pr(event|evidence)). BN can be used to estimate the propagation probability between a pair of nodes. As such, if a source $(i_j)$ is compromised the probability of attack to a target $(i_{j'})$ can be provided as $Pr(i_{j'}|i_j, i_{j'}, i_j \in I)$. BN considers all paths between these nodes and their associated toughness to traverse. Here, $Pr(i_{j'}|i_j)=0$, if and only if there is at least one path between $i_j$ and $i_{j'}$ (i.e., $|P_{(i_j - i_{j'})}| \geq 0$). By joint probability distribution, BN also captures the broad interaction between nodes in the AG. That is, $Pr(I_j|I_{j'}; I_j, I_{j'} \in I)$ where $I_j = \{i_1, \ldots, i_j\}$ and $I_{j'} = \{i_1, \ldots, i_{j'}\}$ are the set of sources and targets respectively given $j \neq j'$.

As described above, the AG enables a defender to inspect all possible sequences of exploits an attacker can take to infiltrate a network and reach its goals. In some examples, a monotonicity assumption can be used to translate the AG into a condition dependency graph, which is beneficial for analyzing large AGs by removing cycles. The monotonicity assumption states that the attacker's capability does not decrease by launching attacks and the attacker does not need to go back to the privileges already gained. This enables the AG to be decomposed into a state graph where each state is called action state. The primary objective of this transitioned model is to represent the progression of the attacker in the network over distinct actions. An action state $(as_i)$ includes pre-condition(s), rule and associated exploit or impact. In the example of FIG. 4, two states have been designated for a better understanding of the model. Each action starts with enabling some pre-conditions for that action state. An enabled pre-condition gives the attacker an opportunity to cause the impact (e.g., execute an exploit). The following example relationship can be provided:

$$P(e|\exists c_{pr}=F_s(e,c_{pr})\in as_i)=0$$

This relationship represents that an exploit cannot be executed until all of its pre-conditions are satisfied. Post-conditions are OR conditions direct from rule to impact. This action state model can efficiently track the movement of the attacker throughout the network.

A successful execution means that an attacker maliciously built a trust relationship between two hosts or gained a privilege in the same host. Post-conditions are OR conditions from rule to impact shown with solid edges in FIG. 4. A post-condition can be treated as a pre-condition for another state. In FIG. 4, for example, attackerlocated_18 and hacl_17 are the pre-conditions for State 1, which satisfy rule_6_16 and derive netaccess_15 as the post-condition. Subsequently, netaccess_15 is used as one of the pre-conditions in State 2. Moreover, multiple pre-conditions can be shared by different impacts and rules, which could result in shared post-conditions as well. This action state model can efficiently track the movement of an attacker throughout the network and minimize the false alarm in alerts.

Figure 5:
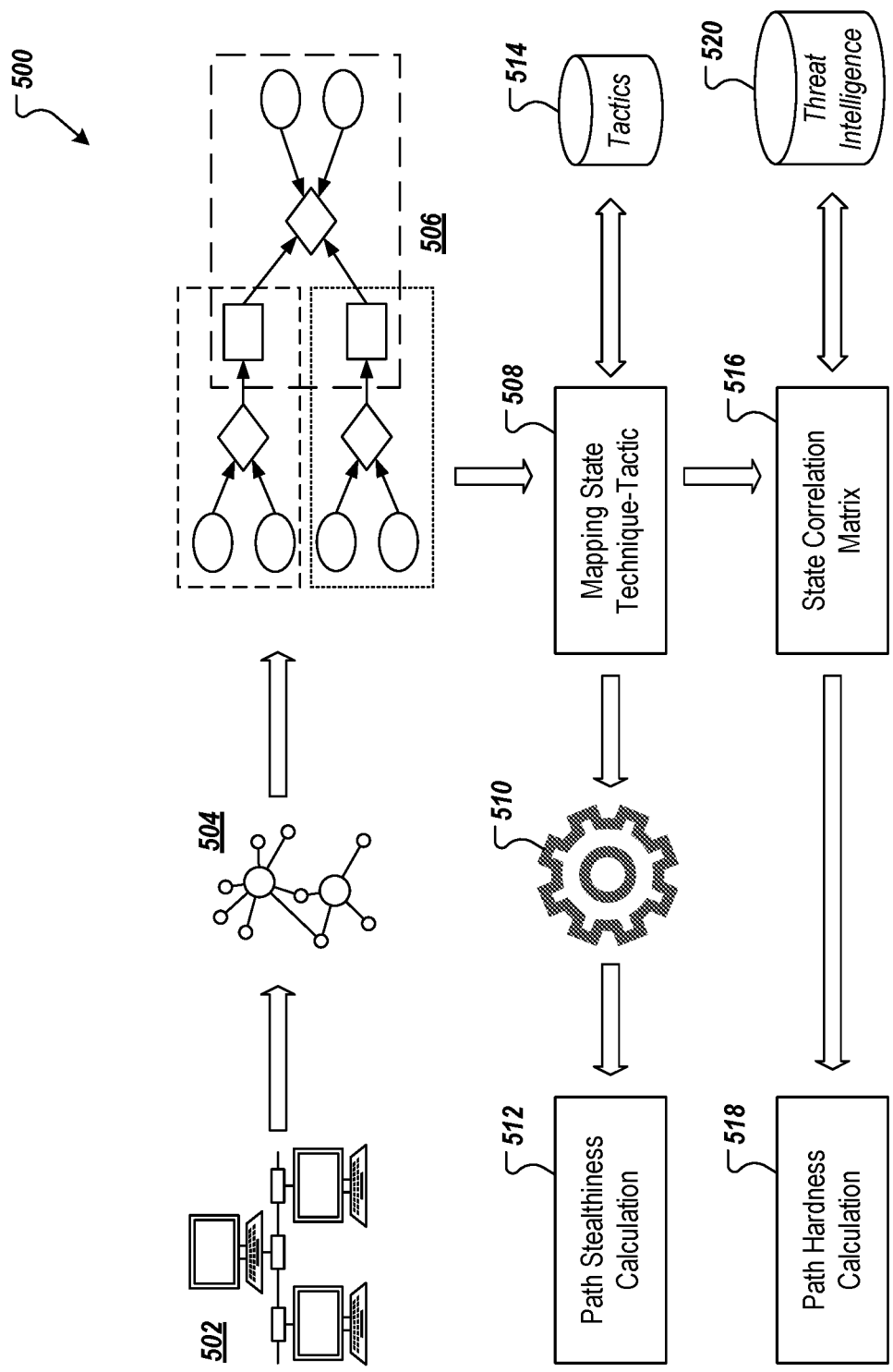
FIG. 5 depicts an example cyber-threat assessment framework in accordance with implementations of the present disclosure.

FIG. 5 depicts an example cyber-threat assessment framework 500 in accordance with implementations of the present disclosure. As described herein, a network 502 is analyzed (e.g., by the AgiSec platform of the present disclosure) to provide an AG 504 (e.g., the AG 300 of FIG. 3). The AG 504 is processed to provide a state graph 506 in a database structure (e.g., Neo4j graph database structure as depicted in the example of FIG. 4), which can be used to identify action states, as described herein.

The example cyber-threat assessment framework 500 includes mapping state technique-tactic 508, which provides a mapping that is processed through security control (SC) identification 510 to provide SCs for each action state. The SCs and action states are processed to in a stealthiest path calculation 512. As described in further detail herein, the mapping is provided based on data provided from an adversarial tactics database 514 (e.g., a MITRE database). The example cyber-threat assessment framework 500 also includes a state correlation matrix 516 that is used in a hardest path calculation 518. As described in further detail herein, the state correlation matrix is provided based on data provided from a threat intelligence database 520.

In further detail, each action state from the state graph 506 is mapped to a certain technique in order to unfold the current phase of attack strategy deployed by the attacker. A model referred to as Adversarial Tactics, Techniques, and Common Knowledge (ATT&CK) characterizes malicious behaviors for each step in a cyber-attack campaign. ATT&CK is provided by The MITRE Corporation. As discussed above, tactics provide the high-level objective representing why an attacker follows a particular behavior in a system and techniques provide more fine-grained information showing how an attack is performed. In accordance with implementations of the present disclosure, each action state is mapped to a distinct high-level category defined in the ATT&CK model. By incorporating this, each attack path eventually exposes a sequence of tactics and techniques.

In further detail, the ATT&CK model categorizes adversarial techniques into different tactics where each technique might fall into multiple tactics. A tactic l can be defined as $tc_l=\{ta_1, \ldots ta_r\}$ enclosing a set of techniques belonging to it. Each action state is mapped to a distinct Technique-Tactic (TT) pair. In the action state model of the present disclosure, each rule represents a threat action associated with some primitives, which are ascribed as configuration nodes in the state graph. The configuration nodes are shared by multiple states. Similarly, different network and system features are shared by multiple techniques. For technique mapping, implementations of the present disclosure use rule and configuration information, which can map one state to several techniques. On the other hand, the tactic describes the sub-goal of a threat action, which is analogous to the impact node of the state graph. Thus, using domain expert knowledge, each state is mapped to a TT pair. From a real attack history, it is evident that each technique often requires a pre-requisite technique to accomplish its goal. For example, in APT33 the technique T1078 (Valid accounts) cannot be performed without performing User Execution (T1204) beforehand. Likewise, in APT1, technique T10005 (Data from Local System) and T1114 (Email Collection) are two pre-conditions for exfiltration of compressed data (T1002).

With regard to stealthiness, a core idea behind stealthiness is how hard an event or phenomenon can be detected in their respective context. This scenario is truer in ICS networks where a persistent attacker continues to move laterally until reaching the target.

The security of a network requires different isolations between hosts, which provides different layers of security in a network. Each layer signifies the type of security resistance that is based on different security devices and capabilities and termed as security control (SC). It can be assumed that the more SCs a path introduces, the more detectable it is by the defender and the less exploitable by the attacker. Based on this assumption, implementations of the present disclosure estimate which path is stealthier.

In order to formalize isolation, various SCs are defined representing different kinds of devices and the level of restriction each provides. In some implementations, SCs can be categorized based on function. Example functions include, without limitation, identification, protection, detection, response, and recovery. SCs can be deployed in the network level, the host level, and/or the application level, and can be categorized into different groups based on their functions.

An example category includes authentication, which represents managing user, device authentication and authorization. Authentication controls the access to device, files, applications, sites, infrastructures, and the like within a pair of hosts in a network. Authorization determines the level of access granted based on the identity of the user. Another example category includes secure communication, where SCs falling into this category ensure secure and encrypted communication. Different devices are used for this pattern by introducing a trusted path (a.k.a. tunnel) between two hosts. They typically encrypt and encapsulate the outgoing packets, and decapsulate and decrypt on the receiving end to verify integrity and authenticity. Another example category is payload inspection, and these SCs are enforced by an intrusion detection system (IDS). The IDS monitors network traffic (packets) for suspicious activity and issues alerts when such activity is discovered. The IDS facilitates the investigation for administrators of the network. Another example category includes secure operation, where these SCs incorporate different tools to perform authenticated scanning on directories, system files and applications to detect potential vulnerability exploitation. Another example category includes deception, which includes SCs providing deliberate and controlled acts to influence and misdirect adversary perception in the network.

The security state of a network is maintained at an acceptable level through imposition of SCs. In ICS networks, most of the hosts are heterogeneous in terms of some properties (e.g., OS, services, criticality). Consequently, security devices are deployed by optimizing desired SCs in different parts of the network such as in a particular sub-net or layer, on a specific service flow, and the like. In an AG, each path has multiple hops from a particular source to destination. Referring again to FIG. 5, after the action state is mapped to technique-tactic (e.g., by the mapping state technique-tactic 508), implementations of the present disclosure identify the security corresponding to that state (e.g., the SC identification 510).

In some implementations, identification of the SC (e.g., the SC identification 510 of FIG. 5) in each action includes extracting the security devices deployed in each host and the network among them. In some examples, a single security device could carry multiple security functions. For example, a firewall would be stateless or stateful, and/or is capable of deep packet inspection (DPI), which gives an additional layer of security. As another example, an IDS could be signature-based or anomaly-based (e.g., Bro, Snort) or inspect files in the system (e.g., Tripwire). However, multiple action states corresponding to each host does not mean that they fall into the same SC coverage.

Implementations of the present disclosure formalize the SC for an action state $as_i$ as $z_{as_i}^k$, which indicates the corresponding $k^{th}$ SC adjoined with action state i. In some implementations, analytics associate each SC with their associated function discussed above. As discussed above, every action state is tied with a technique-tactic index given in the tactics database 514, which also indicates data sources that should be monitored in order to detect a technique. By mapping SC functions to data sources, a set $SC_{as_i}$ is determined for each $as_i$ and includes all of the SC functions that can be used to prevent action state i from being compromised. The strength of a $k^{th}$ SC in $as_i$ is denoted as $w_{as_i}^k$, which represents the number of functions it covers from $SC_{as_i}$. Further, some SCs have more human involvement than others, which is less stealthy for attacker. This is accounted for in a task factor $\gamma^k$. In some implementations, the stealthiness of each $as_i$ is provided as:

$$S_{as_i}^{th} = \frac{\sum_k \{z_{as_i}^k \times w_{as_i}^k \times \gamma^k\}}{|SC_{as_i}|}$$

As in the transformed state graph, each path from a source to target can be represented with a set of states. Consequently, a set of n security states for the path from j to j' can be denoted as $AS_{p_{j,j'}^k} = \{as_1, \ldots, as_n\}$. The path stealthiness score can be provided as:

$$S_{p_{j,j'}^n}^{th} = S_{as_1}^{th} + \ldots + S_{as_m}^{th} = \sum_{i=1}^{m} S_{as_i} = \sum_{i \in AS_{p_{j,j'}^k}} S_{as_i}^{th}$$

With regard to hardness, an attack path is represented not only by the number of steps or lack of detection induced, but also by the complexity of the attack path. This complexity, referred to as hardness herein, enables understanding of an attacker's behavior within a network. In the NVD database, the CVSS provides a complexity score that only accounts for the vulnerability exploitation in terms of an attacker's control over it. But an exploitable vulnerable service is only part of an attack. There are many other related contextual artifacts. An attacker has to pass a chain of actions for a successful execution of an attack path. Each action has its own challenges based on different factors. Moreover, evolving skill of an attacker should be considered for accurate path complexity calculation. As described herein, the example cyber-threat assessment framework 500 of FIG. 5 employs a cyber-based contextual model representing the stages of cyber-attack, with an efficient portrayal of contextual information that is used to determine the hardness of each attack path.

In further detail, an attacker needs to follow a chain of action states to reach a target in the network. Each state is integrated with one or more threat intelligence databases (e.g., the threat intelligence database 520 of FIG. 5). Example threat intelligence databases include, without limitation, ATT&CK, NVD, and Common Weakness Enumeration (CWE). This threat intelligence data provides the corresponding factors that influence an attacker to take a particular action. Multiple techniques from different or the same tactics can have overlapping factors, which help attackers in their future actions. Implementations of the present disclosure track these evolving skills of attackers from state-to-state by constructing a state correlation matrix that quantifies how each state is correlated to other states. The state correlation matrix module 516 of FIG. 5 provides the state correlation matrix, as described herein. In some examples, the state correlation matrix between a state x and a state y is formulated as:

$$CC_{x,y} = AMCC_{x,y} + ENCC_{x,y}$$

where AMCC and ENCC are the attack method correlation and environmental correlation, respectively. In some examples, AMCC is determined by examining whether an attack follows the same technique or emerged from the same weakness. In some examples, ENCC refers to the environmental and system features relevant to the attacks performed in the network. These features include platform, application or service, configuration, and the like. The state correlation matrix is used in calculating the hardness of attack paths, as described in further detail herein.

In further detail, AMCC can be calculated in terms of technique and weakness. For each state, technique is identified from the mapping provided by mapping state technique-tactic 508 of FIG. 5 and weakness is provided from CWE. The following example relationship can be provided:

$$AMCC = \frac{\text{weakness} + \text{correlation}}{2}$$

For example, a state x and a state y can have similar weaknesses and follow the same technique to provide:

$$AMCC = \frac{1+1}{2} = 1$$

As another example, the state x and the state y can have similar weakness, but follow different techniques to provide:

$$AMCC = \frac{1+0}{2} = 0.5$$

With regard to ENCC, ENCC can be calculated in terms of different network system features of a state. By way of non-limiting example, three features (e.g., platform, application service, configuration) can be considered, where the state x and the state y share two of the three features, such that:

ENCC=⅔=0.67

If all features are shared, then:

ENCC=3/3=1

Implementations of the present disclosure define a state hardness $H_{as_i}$ as a function of two parameters, intrinsic state hardness $H_{as_i}(intr)$ and correlated state hardness $H_{as_i}(corr)$. The intrinsic state hardness refers to the difficulty of state irrespective to the attack path it belongs to. The correlated state hardness is determined by correlating with the former states the attacker traversed in a particular path. The hardness of path k from host j to j' is provided as:

$$H_{p^k_{j,j'}} = \sum_{i \in AS_{p^k_{j,j'}}} H_{as_i}(intr) * H_{as_i}(corr)$$

The correlation between state i and q is denoted with correlation coefficient ($CC_{iq}$). For similar states, a decay factor ($\lambda$) is provided and represents the effort reduction in similar actions. That is, the decay factor accounts for improvement in the attacker's skills over time. In some examples, the larger the $\lambda$ is, the easier the same action will be the next time it is performed. Accordingly, the following relationship can be provided:

$$H_{p^k_{j,j'}} = \sum_{i \in AS_{p^k_{j,j'}}} (\alpha_i^{-1} + TSc(ta_t)^{-1})e^{t_{i \leftrightarrow_{si}}(0)\frac{CC_{iq}}{\lambda}}$$

Here, $(a_i^{-1}+TSc(ta_t)^{-1})$ is the criticality of the state where $TSc(ta_t)$ is the technique priority score assuming state i is mapped with technique t and $a_i$ is the vulnerable component risk for this state. The priority score reflects the defender's priority alternatively means less hard for the attacker.

As described herein, implementations of the present disclosure provide finer-grained characteristics, namely, path length (e.g., to identify the shortest attack path), path stealthiness (e.g., to identify the stealthiest path), and path hardness (e.g., to identify the hardest path) representing attack paths in networks. These path characteristics can be used individually or in combination for deployment of cyber defense measures within the network. For example, a threshold value for a characteristic can be implemented, and an alert can be generated when the respective characteristic falls below or exceeds the threshold value (e.g., depending on characteristic). As one example, if a path stealthiness exceeds a respective threshold value, an alert can be provided indicating such and identifying the associated path. As another example, if a path hardness falls below a respective threshold value, an alert can be provided indicating such and identifying the associated path. In this manner, implementations of the present disclosure account for dynamics of the AG over time (e.g., by zero-day vulnerabilities being discovered, assets being added/removed to/from the network) and enable cyber security systems maintain a risk to the network at an acceptable level.

Figure 6:
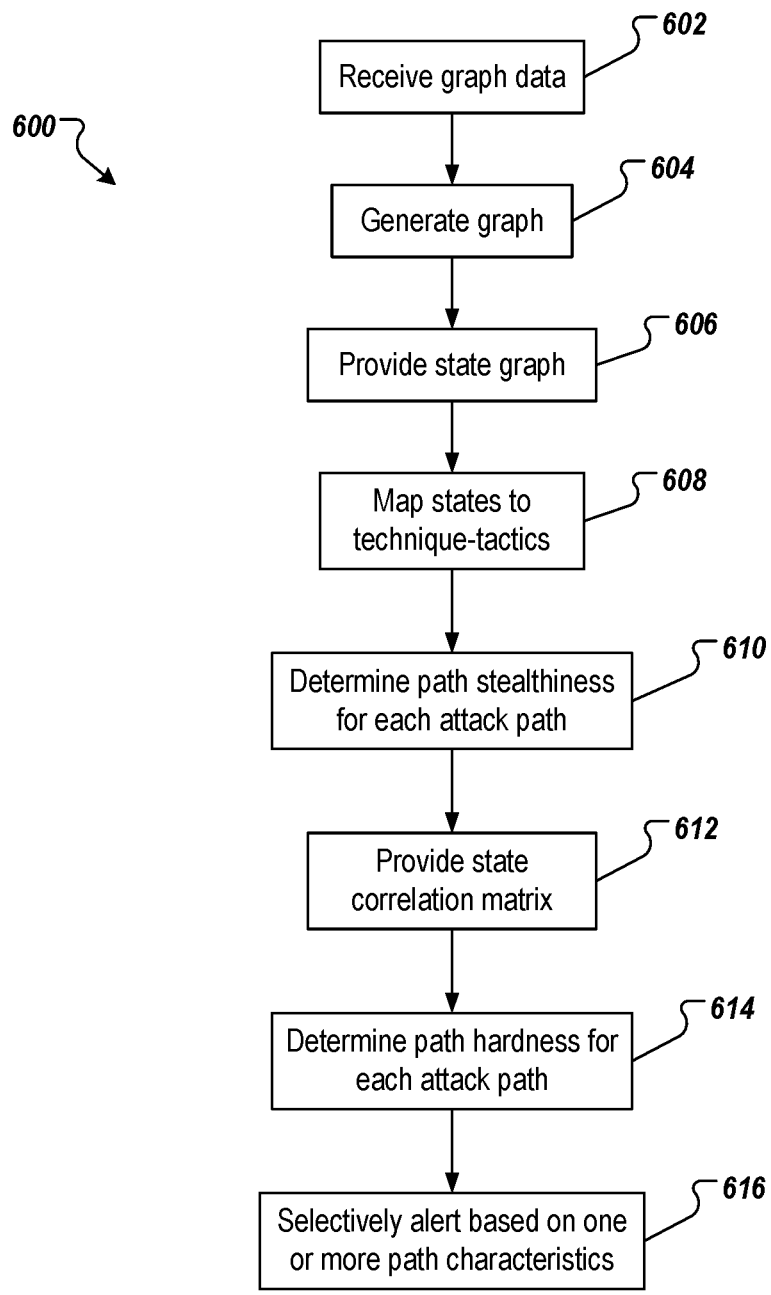
FIG. 6 depicts an example process that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices.

Graph data is received (602). For example, the AgiHack service 208 receives graph data from the AgiDis service 214 of FIG. 2. In some examples, and as described in detail herein, the graph data defines a graph that is representative of an enterprise network. A graph is generated (604). In some examples, and as also described in detail herein, the graph includes nodes and edges between nodes, each node representing an asset within the enterprise network, and each edge representing at least a portion of one or more lateral paths between assets in the enterprise network. In some examples, the graph is provided as an AG, as described herein. A state graph is provided (606). For example, and as described herein, the state graph depicts the AG as sets of configuration nodes, impact nodes, and rule nodes with edges therebetween (see, e.g., FIG. 4). Further, the state graph includes two or more action states.

States of the state graph are mapped to technique-tactics (608). For example, and as described herein, action states of the state graph are each mapped to one or more technique-tactic pairs based on data provided from an adversarial tactics database. In some examples, a tactic in a technique-tactic pair represents an operation an adversary can execute within the network and a technique in the technique-tactic pair represents an action that an adversary can perform to facilitate execution of the tactic. A path stealthiness for each attack path is determined (610). For example, and as described herein, a path stealthiness value for each attack path of a set of attack paths within the network is determined based on the mapping that maps each action state to one or more technique-tactic pairs.

A state correlation matrix is provided (612). For example, and as described herein, the state correlation matrix includes a set of correlation values, each correlation value including an attack method correlation value and an environmental correlation value. In some examples, correlation values are determined based on threat intelligence data from one or more threat intelligence databases. A path hardness for each attack path is determined (614). For example, and as described herein, each path hardness value is determined based on the state correlation matrix that correlates action states relative to each other, and a decay factor that represents a reduction in effort required to repeatedly perform an action of an action state.

Alerts are selectively generated based on one or more path characteristics (616). For example, and as described herein, a threshold value for a characteristic can be implemented, and an alert can be generated when the respective characteristic falls below or exceeds the threshold value (e.g., depending on characteristic). As one example, if a path stealthiness exceeds a respective threshold value, an alert can be provided indicating such and identifying the associated path. As another example, if a path hardness falls below a respective threshold value, an alert can be provided indicating such and identifying the associated path.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for cyber security in networks, the method being executed by one or more processors and comprising:
generating, by an agile security platform hosted by a server system, a state graph in a database structure, the state graph being representative of a set of action states within a network, each action state representing an attack that can be performed by an adversary within the network;
determining, by the agile security platform, a path stealthiness value for each attack path of a set of attack paths within the network, path stealthiness values being determined based on a mapping that maps each action state to one or more technique-tactic pairs and one or more security controls;
determining by the agile security platform, a path hardness value for each attack path of the set of attack paths within the network, path hardness values being determined based on a state correlation matrix that correlates the action states relative to each other, and a decay factor that represents a reduction in effort required to repeatedly perform an action of the action states;
selectively generating, by the agile security platform, one or more alerts based on one or more of path stealthiness values and path hardness values; and
providing, by the agile security platform, the one or more alerts for presentation on a display of a client device.

2. The method of claim 1, wherein each path stealthiness value is determined based on the one or more security controls that are identified for each action state.

3. The method of claim 1, wherein each security control comprises one or more devices that inhibit attacks within the network.

4. The method of claim 1, wherein the state correlation matrix comprises a set of correlation values, each correlation value comprising an attack method correlation value and an environmental correlation value.

5. The method of claim 4, wherein correlation values are determined based on threat intelligence data from one or more threat intelligence databases.

6. The method of claim 1, wherein selectively generating one or more alerts based on one or more of path stealthiness values and path hardness values comprises determining that a path stealthiness value exceeds a respective threshold value, and in response, generating the one or more alerts, the one or more alerts indicating at least a portion of an attack path associated with the path stealthiness value.

7. The method of claim 1, wherein selectively generating one or more alerts based on one or more of path stealthiness values and path hardness values comprises determining that a path hardness value is below a respective threshold value, and in response, generating the one or more alerts, the one or more alerts indicating at least a portion of an attack path associated with the path hardness value.

8. The method of claim 1, wherein the mapping is provided based on data provided from an adversarial tactics database.

9. The method of claim 1, wherein a tactic in a technique-tactic pair represents an operation an adversary can execute within the network and a technique in the technique-tactic pair represents an action that an adversary can perform to facilitate execution of the tactic.

10. The method of claim 1, wherein generating the state graph comprises:
discovering, by the agile security platform, connections between configuration items within the network; and
determining the set of action states based on the connections between the configuration items.

11. The method of claim 1, comprising:
detecting, by the agile security platform, an addition of a configuration item to the network; and
generating, by the agile security platform, an updated state graph representative of an updated set of action states within the network including the added configuration item.

12. A non-transitory computer-readable storage medium coupled to one or more processors and having instructions stored thereon which, when executed by the one or more processors, cause the one or more processors to perform operations for cyber security in networks, the operations comprising:
generating, by an agile security platform hosted by a server system, a state graph in a database structure, the state graph being representative of a set of action states within a network, each action state representing an attack that can be performed by an adversary within the network;
determining by the agile security platform, a path stealthiness value for each attack path of a set of attack paths within the network, path stealthiness values being determined based on a mapping that maps each action state to one or more technique-tactic pairs and one or more security controls;
determining, by the agile security platform, a path hardness value for each attack path of the set of attack paths within the network, path hardness values being determined based on a state correlation matrix that correlates the action states relative to each other, and a decay factor that represents a reduction in effort required to repeatedly perform an action of the action states;
selectively generating, by the agile security platform, one or more alerts based on one or more of path stealthiness values and path hardness values; and
providing, by the agile security platform, the one or more alerts for presentation on a display of a client device.

13. The computer-readable storage medium of claim 12, wherein each path stealthiness value is determined based on the one or more security controls that are identified for each action state.

14. The computer-readable storage medium of claim 12, wherein each security control comprises one or more devices that inhibit attacks within the network.

15. The computer-readable storage medium of claim 12, wherein the state correlation matrix comprises a set of correlation values, each correlation value comprising an attack method correlation value and an environmental correlation value, wherein correlation values are determined based on threat intelligence data from one or more threat intelligence databases.

16. The computer-readable storage medium of claim 12, wherein selectively generating one or more alerts based on one or more of path stealthiness values and path hardness values comprises determining that a path stealthiness value exceeds a respective threshold value, and in response, generating the one or more alerts, the one or more alerts indicating at least a portion of an attack path associated with the path stealthiness value.

17. The computer-readable storage medium of claim 12, wherein selectively generating one or more alerts based on one or more of path stealthiness values and path hardness values comprises determining that a path hardness value is below a respective threshold value, and in response, generating the one or more alerts, the one or more alerts indicating at least a portion of an attack path associated with the path hardness value.

18. The computer-readable storage medium of claim 12, wherein the mapping is provided based on data provided from an adversarial tactics database.

19. The computer-readable storage medium of claim 12, wherein a tactic in a technique-tactic pair represents an operation an adversary can execute within the network and a technique in the technique-tactic pair represents an action that an adversary can perform to facilitate execution of the tactic.

20. A system, comprising:
one or more computers; and
a computer-readable storage device coupled to the computing device and having instructions stored thereon which, when executed by the computing device, cause the computing device to perform operations for cyber security in networks, the operations comprising:
generating, by an agile security platform hosted by a server system, a state graph in a database structure, the state graph being representative of a set of action states within a network, each action state representing an attack that can be performed by an adversary within the network;
determining, by the agile security platform, a path stealthiness value for each attack path of a set of attack paths within the network, path stealthiness values being determined based on a mapping that maps each action state to one or more technique-tactic pairs and one or more security controls;
determining, by the agile security platform, a path hardness value for each attack path of the set of attack paths within the network, path hardness values being determined based on a state correlation matrix that correlates the action states relative to each other, and a decay factor that represents a reduction in effort required to repeatedly perform an action of the action states;
selectively generating, b the agile security platform one or more alerts based on one or more of path stealthiness values and path hardness values; and
providing, by the agile security platform, the one or more alerts for presentation on a display of a client device.

21. The system of claim 20, wherein each path stealthiness value is determined based on the one or more security controls that are identified for each action state.

22. The system of claim 20, wherein each security control comprises one or more devices that inhibit attacks within the network.

23. The system of claim 20, wherein the state correlation matrix comprises a set of correlation values, each correlation value comprising an attack method correlation value and an environmental correlation value, wherein correlation values are determined based on threat intelligence data from one or more threat intelligence databases.

24. The system of claim 20, wherein selectively generating one or more alerts based on one or more of path stealthiness values and path hardness values comprises determining that a path stealthiness value exceeds a respective threshold value, and in response, generating the one or more alerts, the one or more alerts indicating at least a portion of an attack path associated with the path stealthiness value.

25. The system of claim 20, wherein selectively generating one or more alerts based on one or more of path stealthiness values and path hardness values comprises determining that a path hardness value is below a respective threshold value, and in response, generating the one or more alerts, the one or more alerts indicating at least a portion of an attack path associated with the path hardness value.

26. The system of claim 20, wherein the mapping is provided based on data provided from an adversarial tactics database.

27. The system of claim 20, wherein a tactic in a technique-tactic pair represents an operation an adversary can execute within the network and a technique in the technique-tactic pair represents an action that an adversary can perform to facilitate execution of the tactic.

* * * * *

UNITED STATES PATENT AND TRADEMARK OFFICE
CERTIFICATE OF CORRECTION

Page 1 of 1

PATENT NO. : 11,277,432 B2
APPLICATION NO. : 16/554846
DATED : March 15, 2022
INVENTOR(S) : Amin Hassanzadeh, Anup Nayak and Md Sharif Ullah It is certified that error appears in the above-identified patent and that said Letters Patent is hereby corrected as shown below:

In the Claims

Claim 1, Column 25, Line 19, delete "determining" and insert -- determining, --.

Claim 12, Column 26, Line 24, delete "determining" and insert -- determining, --.

Claim 20, Column 28, Line 1, delete "b" and insert -- by --.

Claim 20, Column 28, Line 1, delete "platform" and insert -- platform, --.

Signed and Sealed this
Twentieth Day of February, 2024

Katherine Kelly Vidal
*Director of the United States Patent and Trademark Office*